No. 616,172. Patented Dec. 20, 1898.
C. R. WILLING.
JAW TRAP FOR ANIMALS.
(Application filed July 23, 1898.)
(No Model.)
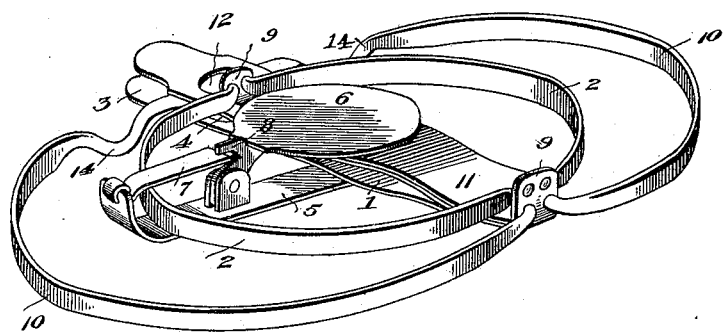
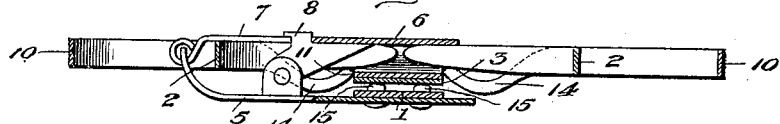
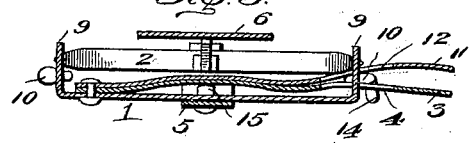
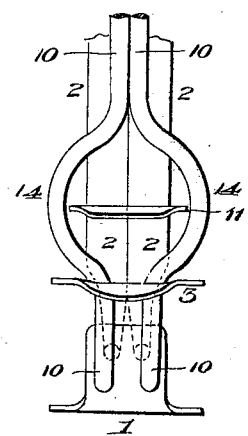
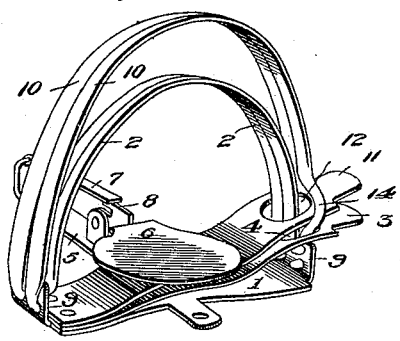
WITNESSES: INVENTOR
Claude R. Willing
BY
ATTORNEYS.
THE NORRIS PETERS CO., PHOTO-LITHO., WASHINGTON, D. C.

UNITED STATES PATENT OFFICE.

CLAUDE R. WILLING, OF NANTICOKE, MARYLAND.

JAW-TRAP FOR ANIMALS.

SPECIFICATION forming part of Letters Patent No. 616,172, dated December 20, 1898.

Application filed July 23, 1898. Serial No. 686,663. (No model.)

*To all whom it may concern:*

Be it known that I, CLAUDE R. WILLING, a citizen of the United States, residing at Nanticoke, in the county of Wicomico and State of Maryland, have invented a new and useful Improvement in Jaw Animal-Traps, of which the following is a specification.

Muskrats are caught for the value of their skins, and to render the catch certain and prevent lacerating or bruising the skin is the purpose of my improvement.

Muskrats are larger than the house-rats, and the spring-jaw trap in general use is not always effective for catching or for preventing the escape of the rat. Moreover, the action of the jaw when sprung is to lift the rat and tend to throw it out, so that it would be caught by one or more legs between the jaws. When so caught, it may twist and work the legs out or knaw off its leg and escape, or escape by a quick upward jump at the instant the jaws are sprung. In these particulars the jaw-trap in common use is wanting in certainty in catching and holding the rat. I have applied to such trap a supplemental pair of jaws arranged outside the main jaws and closing over them, so as to catch the rat in its upward throw or jump should it escape the inner jaws or be caught by them only by the legs.

My improvement resides in the arrangement and the mounting of the supplemental pair of jaws so as to close in lines coincident with the inner jaws, and the precise improvement will be set out in the claims concluding the description.

The drawings illustrate the improvement as applied to the ordinary spring-jaw trap, wherein—

Figure 1 shows the trap as set. Fig. 2 shows the trap in vertical section and the relation of the springs to the jaws when set. Fig. 3 is a cross-section of the same. Fig. 4 shows the trap as sprung, and Fig. 5 is an end view.

In the drawings is seen the ordinary steel spring-jaw trap, to the base-plate 1 of which, at each upset end, are pivoted the jaws 2 2, of semicircular shape, so that when closed they will spring together in arched form over the base-plate and grip the rat between them. A strong spring-plate 3 is riveted at one end to the upper side of the base-plate, and at its free end said spring-plate has a slot 4, through which the jaws are caused to be sprung and held together when the spring-plate is tripped. A cross-bar 5 stands out at one side mediately of the base-plate and has pivoted to it the tripping-plate 6, which overhangs the spring, while a latch 7, pivoted to the end of said bar, is adapted to engage a trip-lip 8 on said plate, the release of which is effected by the feet of the rat on the plate or by otherwise moving it to trip and spring the jaws.

As will be seen, the jaws are pivoted on the inner sides of the upset ends 9 of the base-plate, and in setting the jaws the latch 7 crosses and rests upon one of the jaws to hold the jaws set, so that they spring together over the tripping-plate.

The supplemental jaws 10 are pivoted on the outer sides of the upset ends of the base and below the pivots of the inner jaws, so that when closed the outer jaws arch over the inner jaws, both sets of jaws closing in the same direction.

A second strong spring-plate 11 is riveted to the base-plate beneath the upper spring-plate and has a slot 12 at its free end, through which both sets of jaws pass at their pivoted ends. The supplemental jaws are bowed to form projecting abutments 14, against which the said spring 3 by its slot is caused to act in springing and closing the outer jaws and holding them together. The abutments also allow the outer jaws to close over the plate-spring 11, the free end of which projects through the opening formed between the supplemental jaws by the abutments. These abutments serve also the purpose of allowing the upper spring freedom in its upward throw in closing the inner jaws, for it will be understood that while both sets of jaws are sprung by the tripping-plate the spring-plate of the inner jaws acts to close them a little in advance of the closing action of the lower spring-plate on the abutments of the supplemental jaws. This effect is seen in Fig. 1, where the springs are seen as arranged to act upon the jaws in succession, the inner jaws closing in advance of the outer jaws, but practically simultaneously. Looking at this figure it will also be seen that the closing force of the lower plate-spring will by its slot contribute to hold the inner jaws closed, thereby reinforcing the upper plate-spring and the grip of the inner jaws.

When the trap is set, the free end of the upper spring overlies the pivoted ends of the supplemental jaws, and when the trap is sprung the ends of the springs stand separated to give access to the end of the lower spring for setting the trap. In doing this the supplemental jaws must be first opened by forcing down the lower spring.

To increase the force of the spring-plates, I provide a fulcrum-bearing 15 on the base-plate, over and upon which the plates are forced in setting the trap, and this, while increasing the force, retains the effectiveness of the springs, as they are both set over the same fulcrum-bearing and secured by the same rivets, one lying upon the other.

The springs are separately forced down in setting the jaws, and the setting of the inner jaws by the tripping-plate and latch also sets the supplemental jaws.

Referring to Fig. 1, it will be noted that the free end of the upper spring holds down the free end of the under spring and that the outer jaws are held down by the upper spring. When, therefore, the trap is sprung, the lower spring forces the outer jaws upward, which in turn helps to throw up the inner jaws, and in this way, while the springs act separately upon the jaws, the springs also act together to a certain extent to close the inner jaws.

I claim—

1. In a steel jaw-trap, the inner and the outer pairs of jaws, the outer pair pivoted below the pivots of the inner pair, closing in the same direction and spanning the inner pair, in combination with a pair of spring-plates, the tripping-plate and its latch, said spring-plates secured one upon the other, each having a slot at its free end, the inner jaws passing through the slot of the upper spring, and the outer jaws passing through the slot of the lower spring and having the open way forming side abutments between which the upper spring has freedom for movement and against which abutments the lower spring acts to close the outer jaws in the way described.

2. In a steel jaw-trap, the inner and the outer pairs of jaws, the outer pair pivoted below the pivots of the inner pair, in combination with a pair of spring-plates, one overlying the other, the under spring engaging the outer jaws and the upper spring engaging the inner jaws, a fulcrum-bearing mediately of the length of said springs over and upon which they are set, a tripping-plate and a latch, both sets of jaws closing in the same way, the outer set spanning the inner set.

In testimony whereof I have hereunto signed this specification.

CLAUDE R. WILLING.

In presence of—
JOHN W. COLLIER,
JESSE R. TEAVER.